United States Patent
Boydstun et al.

(10) Patent No.: US 6,839,708 B1
(45) Date of Patent: Jan. 4, 2005

(54) COMPUTER SYSTEM HAVING AN AUTHENTICATION AND/OR AUTHORIZATION ROUTING SERVICE AND A CORBA-COMPLIANT INTERCEPTOR FOR MONITORING THE SAME

(75) Inventors: Kenneth C. Boydstun, Carrollton, TX (US); Bharath N. Kuruvalli, Irving, TX (US); Wing Lee, Overland Park, KS (US); Dora Potluri, Plano, TX (US)

(73) Assignee: Sprint Communication Company L.P., Overland Park, KS (US)

( * ) Notice: Subject to any disclaimer, the term of this patent is extended or adjusted under 35 U.S.C. 154(b) by 352 days.

(21) Appl. No.: 10/083,430

(22) Filed: Feb. 26, 2002

(51) Int. Cl.[7] .............................................. G06F 17/30
(52) U.S. Cl. ......................... 707/10; 707/103; 719/313
(58) Field of Search .................. 707/10, 103; 719/313, 719/315

(56) References Cited

U.S. PATENT DOCUMENTS 6,633,923 B1 * 10/2003 Kukura et al. .............. 719/316

OTHER PUBLICATIONS

Christopher M. King; "Web Access Security"; 2000; TISC Insight, vol. 2, Issue 23.*
Keremitsis et al.; "HP Distributed Smalltalk: a tool for developing distributed applications"; Apr., 1995; Hewlett–Packard Journal, v46, n2, p85(8); ISSN: 0018–1153.*

* cited by examiner

Primary Examiner—Jean M. Corrielus
Assistant Examiner—Gwen Liang

(57) ABSTRACT

A CORBA-compliant computer network includes a registration server on which an AAR service resides, a registry database and an ORB which couples the registry server to the registry database. A CORBA-compliant interceptor residing on the ORB intercepts each message, generated by the AAR service, invoking the registry database and each message, generated by the registry database, responding to the invocation message generated by the service of the client server. The interceptor selects information useful in determining the cause of a failed usage of the service residing in the client server from each intercepted invocation and response messages, writes the selected information to a data store residing in the client server and then re-invokes the intercepted invocation and response messages. In the event of a network failure, the data written to the data store may be reviewed to obtain useful information regarding the network failure.

8 Claims, 3 Drawing Sheets

COMPUTER SYSTEM HAVING AN AUTHENTICATION AND/OR AUTHORIZATION ROUTING SERVICE AND A CORBA-COMPLIANT INTERCEPTOR FOR MONITORING THE SAME

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The invention is directed to a method and apparatus for monitoring operation of a service which controls access to a secured computer platform associated therewith and, more particularly to a computer system on which both an authentication and/or authorization routing service for the secured computer platform and a CORBA-compliant interceptor which provides enhanced logging functionality for operations performed by the authentication and/or authorization service reside.

BACKGROUND OF THE INVENTION

The Internet is a vast computer network comprised of a wide variety of disparate computing devices, interconnected by various connection media, which communicate using the transmission control protocol/Internet protocol ("TCP/IP") set of communication protocols. In recent years, it has become increasingly commonplace for commercial enterprises such as corporations to interconnect with the Internet using a computer system commonly referred to as a web server. While a web server typically maintains publicly available content, oftentimes, it will also maintain content for which access is limited to authorized users. For example, a service provider may provide confidential account information to its customers on-line but would prevent an unrelated third party from being able to review the information. To minimize the security issues raised by allowing customers to access confidential information over an unsecured network, it is oftentimes recommended that the service provider secure the confidential information using an authentication/authorization process. Authentication is the process of verifying a user's identity while authorization is the process of restricting the resources that the user can access after the authentication of the user has been accepted.

A wide variety of solutions to the problem of securing all or a portion of a web site or other computer network have been proposed. Many such solutions require the user to provide information which is used to initiate authentication and/or authorization processes. As the Internet is generally considered to be an unsecured public network, security systems which protect restricted resources of a web site often utilize a tiered security process in which the data used to authenticate and/or authorize users is maintained within a private network, coupled to the web server, but also protected from unauthorized accesses by a firewall. One such tiered security process, commercially known as GetAccess, is manufactured by Entrust, Inc. of Santa Clara, Calif.

A deficiency in the GetAccess tiered security process, as well as other tiered and/or untiered security processes, is that they only provide a minimal amount of information to the service provider regarding authentication and/or authorization failures. When a security process fails, for example, when the security process denies access to an authorized user, the system must be carefully examined to determine the cause of the failure. Typically, existing security processes only report that a particular user's authentication and/or authorization failed. Unfortunately, such a limited amount of information is not particularly useful when attempting to determine the cause of a failure, particularly when the failed security process involves plural servers, databases and communication links, any one of which could be the cause of the failure.

The Common Object Request Broker ("CORBA") specifies a system which provides transparent interoperability between objects in a heterogeneous, distributed environment. Its design is based upon the Object Management Group ("OMG") object model. The OMG object model defines common object semantics for specifying the externally visible characteristics of objects in a standard and implementation-independent way. In this model, clients request services from objects through a standardized interface defined in the OMG Interface Definition Language ("IDL"). A client accesses a targeted object by issuing a request to that object. The request is an event, and it carries information including an operation, the object reference of the service provider and any actual parameters.

The central component of CORBA is the object request broker ("ORB"). The ORB encompasses the entire communication infrastructure necessary to identify and locate targeted objects, handle connection management and deliver data. The ORB core is that part of the ORB that provides the basic representation of objects and the communication of requests thereto. Thus, the basic functionality provided by the ORB core consists of passing the requests from clients to the object implementations on which they are invoked. In order to make a request, the client can communicate with the ORB core through the IDL stub or through the dynamic invocation interface ("DII"). The IDL stub represents the mapping between the implementation language for the client and the ORB core. Thus, the client can be written in any language for which the ORB core supports the mapping thereof. The ORB core then transfers the request to the object implementation which receives the request as an up-call through either an IDL skeleton or a dynamic skeleton.

For the aforementioned reasons, CORBA is a popular standard for developing distributed applications. Interceptors are an optional extension to the ORB. An interceptor is interposed in either the invocation and/or response paths between a client and a targeted object and is responsible for the execution of one or more ORB services. Typically, the ORB will invoke an interceptor upon receiving a particular request for services from a targeted object. The interceptor will then perform one or more actions, including invoking other objects. In this manner, interceptors provide a way to add portable ORB services to a CORBA compliant object system.

By using a CORBA-compliant interceptor to intercept each message to/from a network-level service residing on a computer system forming part of the network and then logging selected information for each intercepted message, this invention provides a tool by which a network administrator or other service technician may readily identify and/or rectify problems with the network-level service.

SUMMARY OF THE INVENTION

In one embodiment, the present invention is directed to a CORBA-compliant computer network which includes a client server, a target device and an ORB which couples the client server to the target device. A CORBA-compliant interceptor residing on the ORB intercepts each message, generated by a service residing on the client server, invoking the target device and each message, generated by the target device, responding to the invocation message generated by the service of the client server. The interceptor selects information useful in determining the cause of a failed usage of the service residing in the client server from each intercepted invocation and response messages, writes the selected information to a data store residing in the client server and then re-invokes the intercepted invocation and response messages. In further aspects thereof, the information selected from the intercepted invocation and response messages identifies a user for which the service residing in the client server is being utilized, the destination of the intercepted invocation and response messages, the time of interception and whether the intercepted invocation and response messages had been successfully routed between the client server and the target device. In others, the client server is a registration server, the service of the client server is an AAR service and the target device is a registry database.

In another embodiment, the present invention is directed to a CORBA-compliant computer network which includes a first server, a second server, a database and a first ORB which couples the first server and the database to the second server. A first client-side CORBA-compliant interceptor residing in the first ORB intercepts messages generated by: (1) a second service residing in the second server when invoking a first service residing in the first server as a target; (2) the second service when invoking the database as a target; (3) the first service when responding to the invocation messages generated by second service; and (4) the database when responding to the invocation messages generated by said second service. Conversely, a first target-side CORBA-compliant interceptor residing in the first ORB intercepts messages generated by: (1) the first service when invoking the second service as a target; and (2) the second service when responding to the invocation messages generated by the first service. The first client-side and target-side interceptors respectively select, from each invocation and response message intercepted thereby, information useful in determining the cause of a failed usage of the second service, write the selected information from each intercepted invocation and response message to the first data store residing in the second server and then re-invoke each intercepted invocation and response message. In one aspect of this embodiment of the invention, the first server is an access server, the first service is an access service, the second server is a registry server, the second service is an AAR service, and the database is a registry database. In this aspect, the first data store residing in the registry server maintains data derived from each message generated in connection with the invocation of the access service as a target of the AAR service, the registry database as a target of the AAR service and the AAR service as a target of the access service.

In a further aspect of this embodiment of the invention, the computer network further includes a third server and a second ORB which couples the first server, the second server and the database to the third server. A second client-side CORBA-compliant interceptor residing in the second ORB intercepts messages generated by: (1) a third service residing in the third server when invoking the first service as a target; (2) the third service when invoking the database as a target; (3) the first service when responding to the invocation messages generated by the third service; and (4) the database when responding to the invocation messages generated by said third service. Conversely, a second target-side CORBA-compliant interceptor residing in the second. ORB intercepts messages generated: by: (I) the first service when invoking the third service as a target; and (2) the third service when responding to the invocation messages generated by the first service.

In further accordance with this aspect of the invention, a third client-side CORBA-compliant interceptor residing in the second ORB intercepts messages generated by: (1) a fourth service residing in the third server when invoking the first service as a target; (2) the fourth service when invoking the second service as a target of said fourth service; (3) the first service when responding to the invocation messages generated by the fourth service; and (4) the second service when responding to the invocation messages generated by said fourth service. Conversely, a third target-side CORBA-compliant interceptor residing in the second ORB intercepts messages generated by: (1) the first service when invoking the fourth service as a target; (2) the fourth service when responding to the invocation messages generated by said first service; (3) the second service when invoking the fourth service as a target; and (4) the fourth service when responding to the invocation messages generated by the second service. Each one of the second and third client-side and target-side CORBA-compliant interceptors selects, from each invocation and response message intercepted thereby, information useful in determining the cause of a failed usage of the third and fourth services, writes the selected information to a second data store residing in the third server and then re-invokes the intercepted message.

In a still further aspect of this embodiment of the invention, the first server is an access server, the first service is an access service, the second server is a first registry server, the second service is a first AAR service, the third server is a second registry server, the third service is a second AAR service, the fourth service is a SM service and the database is a registry database. In accordance with this aspect thereof, the first data store maintains data derived from each message generated in connection with the invocation of: (1) the access service as a target of the first AAR service; (2) the registry database as a target of the first AAR service; (3) the SM service as a target of the first AAR service; and (4) the first AAR service as a target of the access service. The second data store, on the other hand, maintains data derived from each message generated in connection with the invocation of: (1) the access service as a target of the second AAR service; (2) the registry database as a target of the second AAR service; (3) the SM service as a target of the second AAR service; (4) the second AAR service as a target of the access service; (5) the access service as a target of the SM service; and (6) the SM service as a target of the access service. In another, the information selected from each intercepted exchange between identifies: (1) a user for which the service is being utilized; (2) the destination of the intercepted exchange; (3) the time of interception; and (4) whether the intercepted exchange had been successfully routed between the originating device and the destination.

In still another embodiment, the present invention is directed to a method for troubleshooting a multi-tiered secured computer network which includes a first plurality of access servers in a first, extranet, tier and a second plurality of registry servers and a registry database in a second, intranet, tier. In accordance with the method, all exchanges between the registry database and AAR services residing on respective ones of the second plurality of registry servers are intercepted. For each intercepted exchange, selected data regarding the exchange is recorded in a data store residing in the same registry server in which the AAR service involved in the exchange resides. The selected data recorded at one or more of the second plurality of registry servers is then reviewed to obtain useful information regarding a failure of the computer network. In a further aspect of this embodiment of the invention, all exchanges between each AAR service of the second plurality of registry servers and an access service residing in each respective one of the first plurality of access servers are also intercepted. As before, selected data regarding each such intercepted exchange is recorded in the data store of the registry server in which the AAR service involved in the exchange resides. For either of the aforementioned methods, the selected information recorded in the data store of the registry server in which the AAR service resides may include the identity of the user requesting authentication/authorization, the destination of the exchange, the time of interception of the exchange and whether the exchange was successfully routed.

In still another aspect of this embodiment, all exchanges between a SM service residing in the first registry server and each AAR service of the second plurality of registry servers are intercepted and selected data regarding the intercepted exchange is recorded in the data store of the first registry server. The data selected from the intercepted exchanges between the SM service and the AAR services may include the identity of the user engaged in a session to which the exchange relates, the destination of the exchange, the time of interception of the exchange and whether the exchange was successfully routed. In still another aspect, all exchanges between the SM service and each said access service of the first plurality of access servers are intercepted and selected data regarding the exchange is recorded in the data store of the first registry server. Here, the data selected from the intercepted exchanges between the SM service and each access service of the first plurality of access servers may include the identity of the user engaged in a session to which the exchange relates, the destination of the exchange, the time of interception of the exchange and whether the exchange was successfully routed.

In still yet another embodiment, the present invention is directed to a method for troubleshooting a multi-tiered secured computer network having a first, extranet, tier and a second, intranet, tier. The extranet includes a first plurality of web servers, each having a runtime service residing therein and a second plurality of access servers, each having an access service residing therein. The intranet includes a third plurality of registry servers and a registry database. A first one of the third plurality of registry servers has an SM service, an AAR service and a data store residing therein while the remaining ones of the third plurality of registry servers have an AAR service and a data store residing therein. In accordance with the method, all exchanges between the registry database and each said AAR service are intercepted and selected data therefrom recorded in the data store of the registry server in which the AAR service involved in the exchange resides. All exchanges between each AAR service and each access service are intercepted and selected data therefrom recorded in the data store of the registry server in which the AAR service involved in the exchange resides. All exchanges between the SM service each said AAR service are intercepted and selected data therefrom recorded in the data store of the first registry servers. Finally, all exchanges between the SM service and each runtime service of the first plurality of web servers are intercepted and selected data therefrom recorded in the data store of the first registry server. Useful information regarding a failure of the computer network may then be derived by reviewing the selected data recorded at one or more of the third plurality of registry servers.

For intercepted exchanges involving one of the AAR services, the selected data stored in the corresponding registry server may include the identity of the user requesting authentication/authorization, the destination of the exchange, the time of interception of the exchange and whether the exchange was successfully routed. Conversely, for intercepted exchanges involving the SM service, the selected data stored in the first registry server may include the identity of the user engaged in a session to which the exchange relates; the destination of the exchange, the time of interception of the exchange and whether the exchange was successfully routed.

DETAILED DESCRIPTION OF THE INVENTION

Figure 1:
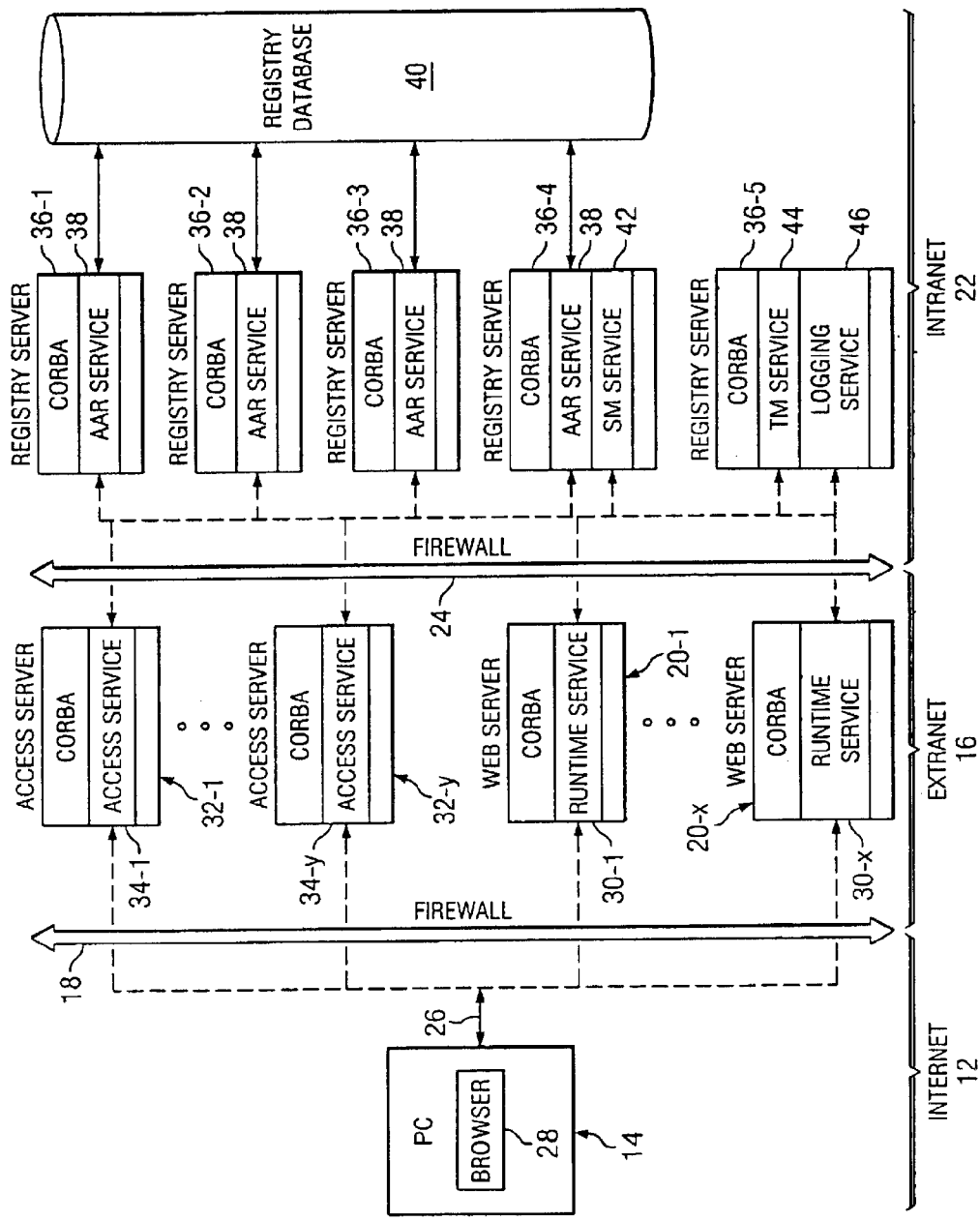
FIG. 1 is a block diagram of a computer network which includes plural computer systems, each having at least one CORBA service and an associated system for monitoring the at least one CORBA service.

FIG. 1 shows a computer network 10 having at least one computer system for which access is limited to authorized users. The computer network 10 is configured as a multi-tiered network which includes an unsecured network 12 within which a computer user operating a computer system 14 may freely operate, a limited access network 16, protected from the unsecured network 12 by firewall 18, which includes a computer system (in a preferred embodiment a web server) 20-1 containing information which the computer user may access if properly authorized but: is otherwise inaccessible to unauthorized users within the unsecured computer network 12, and a secured network 22, protected from the limited access network by firewall 24, inaccessible to users operating within the unsecured network 12.

In the example illustrated herein, the unsecured network 12 is the Internet, the limited access network 16 is an extranet and the secured network 22 is an intranet. It should be noted that, as used herein, the extranet 16 includes computer systems, for example, web server 20-1, more commonly considered to form part of the Internet 12. As used herein, however, a computer system configured to limit access to at least a portion of the content maintained thereby to authorized users is deemed to form part of an extranet operated by the content provider. Furthermore, it is fully contemplated that the invention is suitable for use within a wide variety of computer networks for which access to a first portion thereof is limited to a subset of the group of users having access to a second portion of the network. Thus, the invention is suitable for use within a wide variety of computer networks, including those fully or partially comprised any combination of one or more local area networks ("LANs"), wide area networks ("WANs"), intranets, extranets and virtual private networks ("VPNs").

The computer system 14, for example, a personal computer ("PC"), is coupled to the unsecured computer network 12 by communication link 26. Of course, by way of example, FIG. 1 shows a single PC 14 coupled to the unsecured computer network 12. More typically, however, many more PCs (or other types of computer systems) 14 would be coupled thereto. Variously, the communication link 16 may include an analog or digital dial-up connection, a digital subscriber line ("DSL"), a cable modem or a dedicated circuit. A user accesses the computer network 10 using access software 28 residing on the PC 14. For example, if the unsecured computer network 12 is the Internet or other computer network using the TCP/IP standards, suitable access software would include a commercially available web browser, for example, Microsoft Explorer or Netscape Navigator.

Using the web browser 28, a user may view content maintained at a web server (not shown) located within the unsecured computer network 12 or, if desired, may view content maintained at one of the web servers 20-1 through 20-x located within the limited access network 16. Typically, the web servers 20-1 through 20-x are mirrored servers, the number of which varies depending on the number and/or geographical distribution of users seeking to access the content identically maintained in each web server 20-1 through 20-x. For example, in the embodiment disclosed herein, 120 web servers are used to provide content, more specifically, individual account information, to approximately over 1.2 million users. Each web server 20-1 through 20-x is a CORBA-compliant server having a corresponding runtime service 30-1 through 30-x which interacts, in a manner to be more fully described below, with registry servers 36-1 thru 36-5 of the secured network 22 via its ORB (not shown).

As disclosed herein, each web server 20-1 through 20-x maintains two types of content—unrestricted and restricted. Unrestricted content may be viewed by all users accessing the web server while restricted content is limited to viewing by authenticated users who have been authorized to view the restricted content. Authentication is the process of verifying a user's identity while authorization is the process of restricting the resources that an individual can access after the authentication of the user has been accepted. To access content maintained at one of the web servers 20-1 through 20-x, a user operating the PC 14 would provide the browser 28 with the universal resource locator ("URL") address for the limited access network 16. In turn, the browser 28 would navigate to the limited access network 16 where a first load balancer (not shown) would direct the browser 28 to one of the web servers 20-1 through 20-x, for example, the web server 20-1, where unrestricted content is downloaded to the browser 28 for display, most typically, as a web page. If the user operating the PC 14 later seeks to view restricted content, for example, if the user issues a request to the web server 20-1 to view account information, the user shall be re-directed to a new location for initiation of authentication and/or authorization processes.

To perform the aforementioned authentication and/or authorization processes, the limited access network 16 further includes plural access servers 32-1 through 32-y. Similar to the web servers 20-1 through 20-x, each access server 32-1 through 32-y is a CORBA-compliant server having a corresponding access service 34-1 through 34-y which interacts, in a manner to be more fully described below, with various computer systems forming part of the secured network 22 via its ORB (not shown). The number of access servers 32-1 through 32-y needed to support the web servers 20-1 through 20-x will vary based upon a number of factors, among them, the number of web servers to be supported and the frequency at which the web servers require the services of an access server. For the previously described example in which over 1.2 million users are supported by 120 web servers, in turn, those 120 web servers are supported by 12 access servers. Upon issuing a request to view restricted content, a second load balancer (also not shown) would select one of the access servers 32-1 through 32-y, for example, the access server 32-1, to perform the authentication and/or authorization processes. The second load balancer would then re-direct the browser 28 from the web server 20-1 to the access server 32-1.

While a wide variety of authentication and/or authorization processes are known in the art and many such processes would be suitable for the disclosed purpose of restricting access to selected content to authenticated users who have been authorized to view that content, such authentication and/or authorization processes typically involve the user operating the PC 14 to provide the access server 32-1 with requested information, for example, an account number and a password. Upon receiving the requested information from the user, the access server 32-1 executes an authentication and/or authorization session using the access service 34-1 to verify the user's identity and to determine whether the user is authorized to view the requested content. Of course, many authentication and/or authorization services are more sophisticated. For example, it is specifically contemplated that the access services 34-1 through 34-y may be web-enabled Java applications that enable users to sign on, perform self-registration, begin and end authentication/authorization sessions, change passwords, and update their account profile.

As may be further seen in FIG. 1, the service provider uses a multi-tier authentication and/or authorization process in which a portion of the process is executed within the secured network 22 which, as previously set forth, is protected from access by third parties by the firewall 24. More specifically, when executing the authentication and/or authorization process, the access service 34-1 residing on the access server 32-1 utilizes services residing on registry servers 36-1 through 36-5 and information stored on registry database 40 to complete the authentication and/or authorization process. For the previously described example in which over 1.2 million users are supported by 120 web servers which, in turn, are supported by 12 access servers, five registry servers 36-1 through 36-5 and a single registry database 40, when configured in the manner herein described, can suitably support the access services 34-1 through 34-y residing on respective ones of the access servers 32-1 through 32-y, the runtime services 30-1 through 30-x residing on respective ones of the web servers 20-1 through 20-x as well as any other services which would ordinarily reside on either the web servers 30-1 through 30-x and/or the access servers 32-1 through 32-y but which have been omitted from FIG. 1 for ease of description.

Each one of the registry servers 36-1 through 36-5 is a CORBA-compliant server having at least one service residing thereon. More specifically, each one of the first, second, third and fourth registry servers 36-1, 36-2, 36-3 and 36-4 has a first CORBA service 38, more specifically, an authentication and authorization routing ("AAR") service 38, residing therein. The AAR services 38 are utilized by the access services 34-1 through 34-y when executing authentication and/or authorization services. More specifically, a password and/or other information, provided to the access server 32-1 by a user, is transported by the access service 34I to one of the registry servers 36-1, 36-2, 36-3 or 36-4, for example, the registry server 36-1, selected by a load balancer (not shown). The AAR service 38 residing on the selected registry server 36-1 checks the password and/or other information provided by the user against encrypted data stored in the registry database 40. As disclosed herein, the AAR service 38 is an extensible framework that supports multiple authentication and authorization mechanisms while providing a single, unified interface to an end user.

In addition to the AAR service 38, the fourth registry server 36-4 has a second service 42, more specifically, a session management ("SM") service 42 residing thereon. The SM service 42 works in conjunction with each of the AAR services 38, including the AAR service %38 residing on the first, second and third registry servers 36-1, 36-2 and 36-3, respectively. More specifically, after one of the AAR services 38, for example, the AAR service 38 residing on the registry server 36-1 authenticates a user based upon a comparison of the password and/or other information provided by the user against encrypted data stored in the registry database 40 and determines a list of authorized privileges for the authenticated user, the AAR service 38 residing on the registry server 36-1 will ask the SM service 42 residing on the registry server 36-4 to assign a session ID and encryption key for the user. The SM server 42 creates a new session and returns a session ID to the access service 34-1 residing on the access server 32-1 which provided the information to the registry server 36-1. To complete the login process, the access server 32-1 writes cookies back to the browser 28 that contains the session ID, user ID and encryption key. The browser 28 is then redirected back to the web server 20-1 to continue the session. Now, however, the information contained in the cookies returned to the browser will enable the user to view the restricted content to which access had previously been sought.

Finally, the fifth registry server 36-5 has third and fourth services 44 and 46, more specifically a topology management ("TM") service 44 and a logging service 46. The TM service 44 facilitates secure, efficient communication between replicated and distributed services. Regardless of the server on which they reside, whenever other services are launched, they register themselves with the TM service 44 located on the fifth registry server 36-5. Using the provided registration information, the TM service 44 is able to keep track of all instances of distributed objects such as the AAR services 38 and the SM service 42, as well as their respective location and status. In some alternative embodiments, the TM service may also maintain an inventory of components, patches, service packs, bug fixes, new versions and the like. The logging service 46 handles the distribution and recording of internal and user-related events. For example, log-in requests are sent to the logging service 46 where they are recorded. The logging service 46 also records the time of last successful and unsuccessful login as well as the number of consecutive unsuccessful login attempts.

Figure 2:
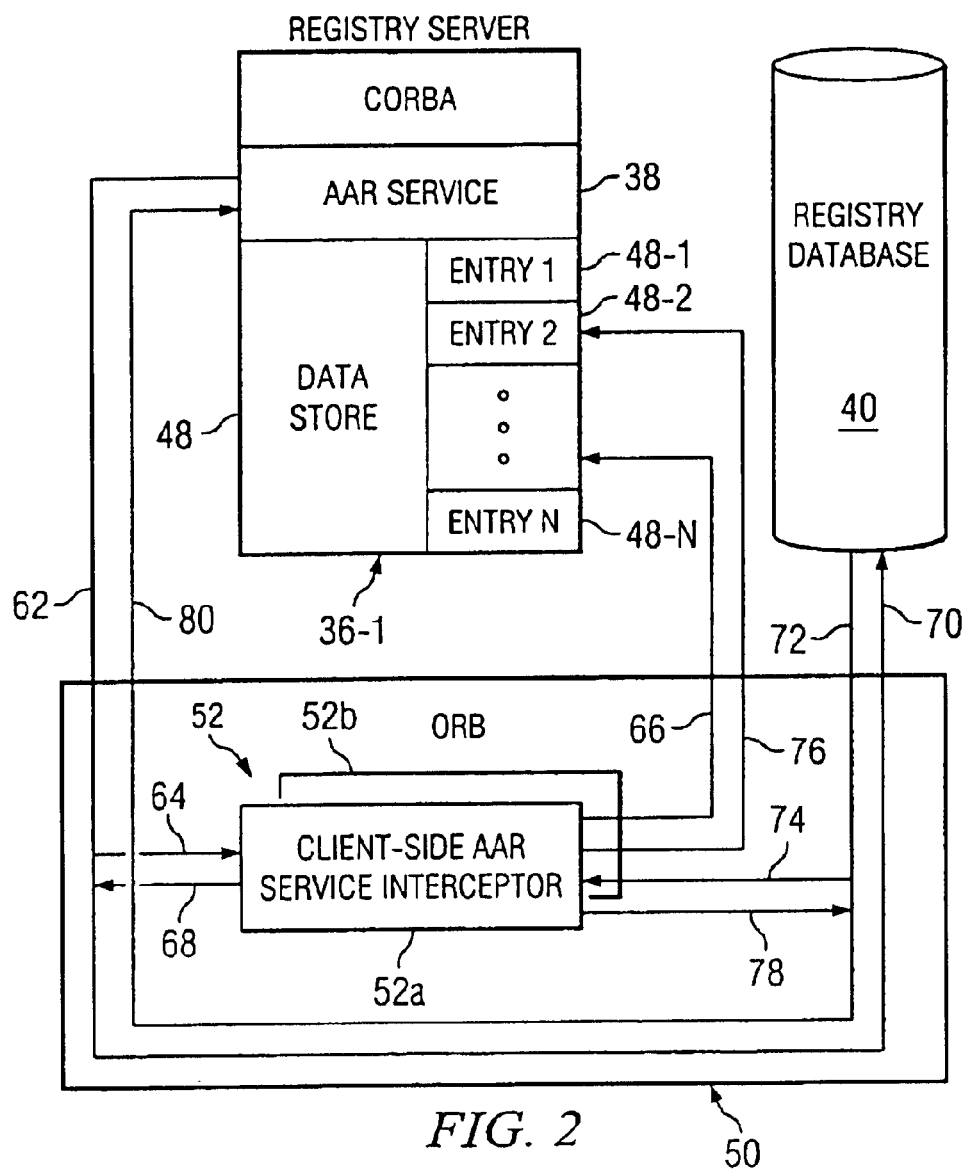
FIG. 2 is an expanded block of a first computer system of the computer network of FIG. 1, the first computer system having an AAR service and a system for monitoring the AAR service.

Turning next to FIG. 2, the registry server 36-1 will now be described in greater detail. It should be noted, of course, that the registry servers 36-2 and 36-3 are similarly configured as the registry server 36-1 and that all further description of the registry server 36-1 applies equally to the registry servers 36-2 and 36-3. As may now be seen, in addition to the AAR service 38, a data store 48 (in a preferred embodiment a log file or log store, but the data store could alternatively be another flat file, relational database, directory service, or other data store as recognized by those of skill in the art) also resides on the registry server 36-1. As will be more fully described below, the data store 48 maintains information regarding all authentication and/or authorizations processes which involve the AAR service 38 residing on the registry server 36-1. More specifically, each time the AAR service 38 residing on the registry server 36-1 employs the services of another service, for example, whenever the AAR service 38 issues a request to the registry database 40 as to whether a particular user is identified in the registry database 40 as an authorized user, or another service employs the services of the AAR service 38, for example, whenever the access service 34-1 residing on the access server 32-1 requests that the AAR service 38 residing on the registry server 36-1 authenticate and/or authorize a user, information regarding the use of another service is maintained in the data store 48.

Messages to and/or from the AAR service 38 residing on the registry server 36-1 are transmitted through ORB 50. As previously described, the ORB 50 encompasses the entire communication infrastructure necessary to handle connection management and deliver data. In accordance with the teachings of the present invention, for each CORBA service residing on the registry server 36-1, a corresponding interceptor has been implemented within the ORB 50. Accordingly, FIG. 2 shows an AAR service interceptor 52 implemented within the ORB 50. Of course, if additional CORBA services resided on the registry server 36-1, corresponding interceptors would be implemented within the ORB 50. Other components of the ORB 50, for example, interface definition language ("IDL") stubs, dynamic invocation interfaces ("DIIs"), IDL skeletons and dynamic skeletons interfaces, have been omitted from FIG. 2 for ease of illustration.

The AAR service interceptor 52 is, in fact, comprised of a pair of interceptors, specifically, a client-side AAR service interceptor 52a and a target-side AAR service interceptor 52b. The client-side AAR service interceptor 52a is invoked whenever the AAR service 38, is accessing another CORBA service. For such an access, the AAR service would be termed a CORBA client and the accessed service would be termed a CORBA target object. Conversely, the target-side AAR service interceptor 52b is invoked whenever another CORBA service is accessing the AAR service 38. For such an access, the other CORBA service would be termed a CORBA client and the AAR service would be termed a CORBA target object. If desired, the client-side and target side AAR service interceptors 52a and 52b may be implemented in a common source file. Alternately, they may be implemented in discrete source files.

Continuing to refer to FIG. 2, the operation of the AAR service 38 residing on the registry server 36-1 in connection with an authentication and/or authorization process will now be described in greater detail. As previously set forth, the AAR service 38 residing on the registry server 36-1 utilizes the registry database 40 to authenticate and/or authorize a user. Accordingly, as the AAR service 38 is issuing a request for services of the registry database 40, the AAR service 38 is a CORBA client. Conversely, as the services of the registry database are being requested, the registry database is a CORBA target object. Thus, the AAR service interceptor that will be invoked during the exchange therebetween will be the client-side AAR service interceptor 52a.

When the AAR service 38 residing on the registry server 36-1 issues a request to the registry database 40, the requesting message first travels to the ORB 50 at step 62. Before allowing the request to pass to the registration database 40, the ORB 50 invokes the client-side AAR service interceptor 52*a* at step 64. The client-side AAR service interceptor 52*a* examines the requesting message received by the ORB 50 and writes information contained in selected fields of the received requesting message to a first entry 48-1 in the data store 48 at step 66. Upon writing the selected information to the data store 48, the client-side AAR service interceptor 52*a* re-invokes the original requesting message initially invoked by the AAR service 38, the re-invoked requesting message is returned to the ORB 50 at step 68 where it resumes its path to the registry database 40 at step 70. If the client-side AAR service interceptor 52*a* successfully re-invokes the original requesting message, the client-side AAR service interceptor 52*a* will also write an indicator that the message was successful to the first entry 48-1 in the data store 48.

The request is processed at the registry database 40 and an appropriate response message constructed. The response message leaves the registry database 40 and arrives at the ORB 50 at step 72. Because the response message destined for the AAR service 38 was generated in response to a request for services by the AAR service 38, the ORB 50 again invokes the client-side AAR service interceptor 52*a* at step 74. The client-side AAR service interceptor 52*a* examines the response message received by the ORB 50 and writes information contained in selected fields of the received response message to a second entry 48-2 in the data store 48 at step 76. Upon writing the selected information to the data store 48, the client-side AAR service interceptor 52*a* re-invokes the original response message generated by the registry database 40, the re-invoked response message is returned to the ORB 50 at step 78 where it resumes its path to the AAR service 38 at step 80. If the client-side AAR service interceptor 52*a* successfully re-invokes the original response message, the client-side AAR service interceptor 52*a* will also write an indicator that the message was successful to the second entry 48-2 in the data store 48.

In accordance with the embodiment of the invention disclosed herein, the information extracted from the requesting messages generated by the AAR service 38 residing on the registry server 36-1 and written, by the client-side interceptor 52*a* to an entry in the data store 48 includes: (1) a first data field which identifies the user initiating the use of the service; (2) a second data field which identifies the destination of the message; and (3) the time at which the request was issued. Each entry would also include, in a fourth data field, whether the message was successfully passed to its destination. For the example disclosed herein, the user initiating the use of the AAR service would be the user of the PC 14 and the destination of the request would be the registry database 40. Similarly, the information extracted from the response an entry in the data store 48 includes: (1) a first data field which identifies the user initiating the use of the service; (2) a second data field which identifies the destination of the message; and (3) the time at which the request was issued. Each entry would also include, in a fourth data field, whether the message was successfully passed to its destination. For the example disclosed herein, the user initiating the use of the AAR service would again be the user of the PC 14 while the destination of the response message would be the registry server 36-1.

Figure 3:
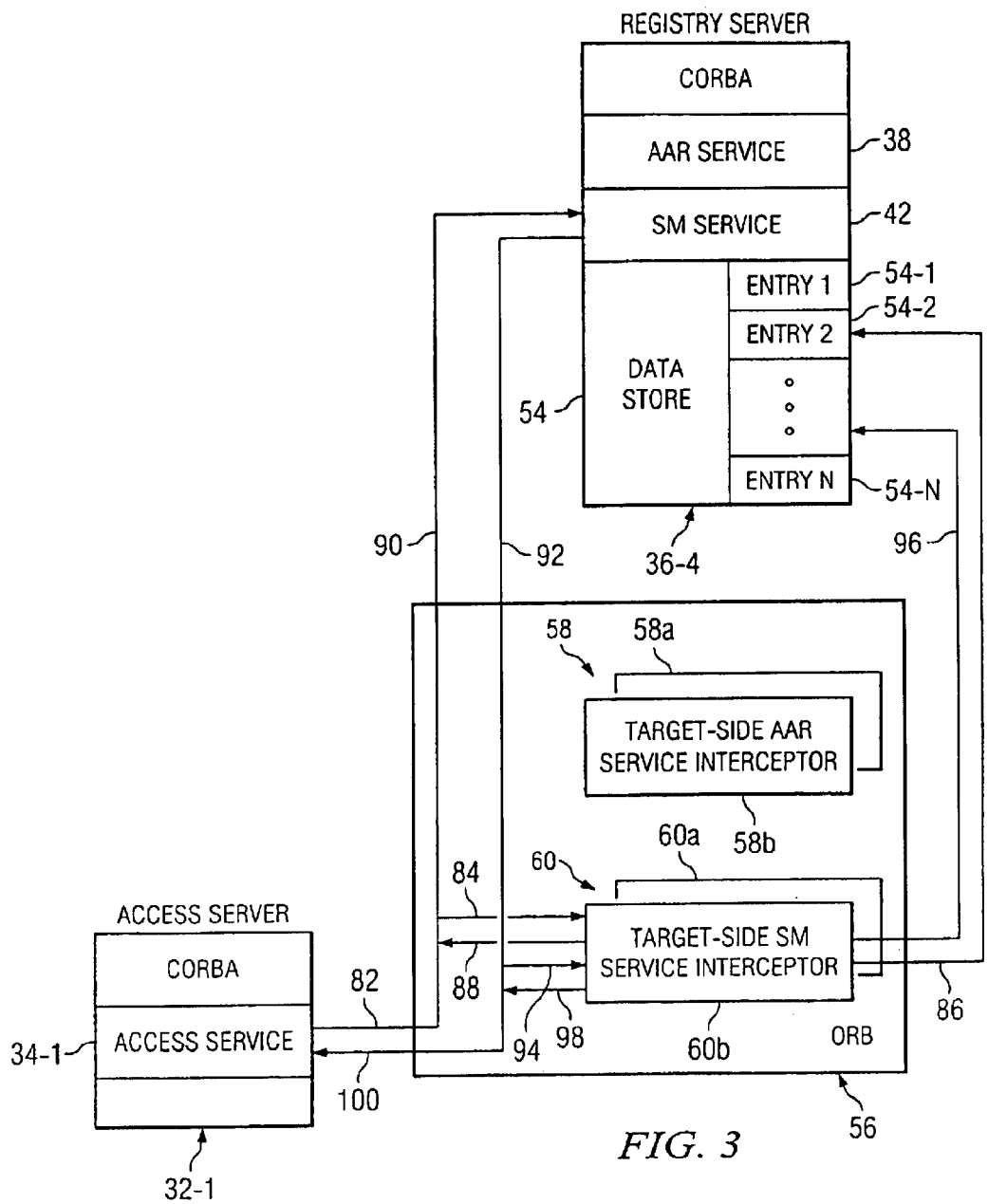
FIG. 3 is an expanded block diagram of a second computer system of the computer network of FIG. 1, the second computer system having AAR and SM services and a system for monitoring the AAR and SM services.

Referring next to FIG. 3, the registry server 36-4 will now be described in greater detail. The registry server 36-4 differs from the registry server 36-3 described with respect to FIG. 2 in that plural services, specifically, the AAR service 38 and the SM service 42, and a data store 54 (preferably a log file or log store) reside thereon. Like the data store 48, the data store 54 maintains information regarding all authentication and/or authorization processes which involve the AAR service 38 residing on the registry server 36-4. The data store 54 also maintains, however, information regarding processes involving the SM service 42. More specifically, each time another service employs the services of the SM service 42 residing on the registry server 36-4, for example, when the AAR service 38 requests that the SM service 42 assign a session ID and encryption key for an authenticated user or when the SM service 42 residing on the registry server 36-4 employs the services of another service, for example, when the SM service 42 provides session information to a requesting service, the use of another service is also maintained in the data store 54.

Messages to and/or from the AAR service 38 and SM service 42 residing on the registry server 36-4 are transmitted through ORB 56. For each CORBA service residing on the registry server 36-4, a corresponding interceptor has been implemented within the ORB 56. Accordingly, FIG. 3 shows an AAR service interceptor 58 and a SM service interceptor 60 implemented within the ORB 56. Each of the interceptors 58, 60 are, in fact, comprised of a pair of interceptors. Accordingly, the AAR service interceptor 58 is comprised of client-side and target-side AAR service interceptors 58*a* and 58*b* while the SM service interceptor 60 is comprised of client-side and target-side interceptors 60*a* and 60*b*. As before, other components of the ORB 56, for example, IDL stubs, DIIs, IDL skeletons and dynamic skeleton interfaces, have been omitted from FIG. 3 for ease of illustration.

Continuing to refer to FIG. 3, the operation of the SM service 42 in connection with a selected portion of an authentication and/or authorization process, specifically, when the access service 34-1 residing on the access server 32-1, acting as a CORBA client, employs the services of the SM service 42 residing on the registry server 36-4 as its CORBA target object. When the access service 34-1 residing on the access server 32-1 issues a request to the SM service 42, the requesting message first travels to the ORB 56 at step 82. Before allowing the request to pass to the SM service 42, the ORB 56 invokes the target-side SM service interceptor 60*b* at step 84. The target-side SM service interceptor 60*b* examines the requesting message received by the ORB 56 and, writes information contained in selected fields of the received requesting message to a first entry 54-1 in the data store 54 at step 86. Upon writing the selected information to the data store 54, the target-side SM service interceptor 60*b* re-invokes the original requesting message initially invoked by the access service 34-1, the re-invoked requesting message is returned to the ORB 56 at step 88 where it resumes its path to the SM service 42 at step 90. If the target-side SM service interceptor 60*b* successfully re-invokes the original requesting message, the target-side SM service interceptor 60*b* will also write an indicator that the message was successful to the first entry 54-1 in the data store 54.

The request is processed at the SM service 42 residing at the registry server 36-4 and an appropriate response message constructed. The response message leaves the SM service 42 and arrives at the ORB 56 at step 92. Because the response message destined for the access service 34-1 was generated in response to a request for services by the access service 34-1, the ORB 56 again invokes the target-side SM service interceptor 60*b* at step 94. The target-side SM service interceptor 60*b* examines the response message received by the ORB 56 and writes information contained in selected fields of the received response message to a second entry 54-2 in the data store 54 at step 96. Upon writing the selected information to the data store 54, the target-side SM service interceptor 60*b* re-invokes the original response message generated by the SM service 42 residing in the registry server 35-4, the re-invoked response message is returned to the ORB 56 at step 98 where it resumes its path to the access service 34-1 at step 100. If the target-side SM service interceptor 60*b* successfully re-invokes the original response message, the target-side SM service interceptor 60*b* will also write an indicator that the message was successful to the second entry 54-2 in the data store 54.

By maintaining, at each registry server, selected information related to each usage of the authentication services residing at the registry servers, troubleshooting a computer network which includes the registry servers is enhanced. For example, upon a failure of the computer network to authenticate a user, by reviewing the information maintained at the data store provided at each registry server, a network administrator may readily determine whether the failure occurred at the access server, the registry server, the registry database or the communication links therebetween. By being able to quickly identify the location of the failure, then the network administrator can more efficiently initiate remedial action.

Thus, there has been described and illustrated herein, a CORBA-compliant computer network and an associated method for obtaining information regarding failures of such a CORBA-compliant network. However, those skilled in the art should recognize that numerous modifications and variations may be made in the techniques disclosed herein without departing substantially from the spirit and scope of the invention. Accordingly, the scope of the invention should only be defined by the claims appended hereto.

What is claimed is:

1. A CORBA-compliant computer network, comprising:
   a first server having a first service residing therein;
   a second server having a second service and a first data store residing therein;
   a database;
   a first ORB having first client-side and target-side CORBA-compliant interceptors residing therein, said first server and said database coupled to said second server through said first ORB;
   said first client side CORBA-compliant interceptor intercepting:
   (1) messages generated by said second service when invoking said first service as a target of said second service;
   (2) messages generated by said second service when invoking said database as a target of said second service;
   (3) messages generated by said first service when responding to said invocation messages generated by said second service; and
   (4) messages generated by said database when responding to said invocation messages generated by said second service;
   said first target-side CORBA-compliant interceptor intercepting:
   (1) messages generated by said first service when invoking said second service as a target of said first service; and
   (2) messages generated by said second service when responding to said invocation messages generated by said first service;
   said first client-side and target-side CORBA-compliant interceptors selecting, from each said intercepted invocation and response message, information useful in determining a cause of a failed usage of said second service, writing said selected information from each said intercepted invocation and response message to said first data store residing in said second server and re-invoking each said intercepted invocation and response message,
   a third server having a third service, a fourth service and a second data store residing therein;
   a second ORB having second and third client-side and second and third target-side CORBA-compliant interceptors residing therein, said first server, said second server and said database coupled to said third server through said second ORB;
   said second client side CORBA-compliant interceptor intercepting:
   (1) messages generated by said third service when invoking said first service as a target of said third service;
   (2) messages generated by said third service when invoking said database as a target of said third service;
   (3) messages generated by said first service when responding to said invocation messages generated by said third service; and
   (4) messages generated by said database when responding to said invocation messages generated by said third service;
   said second target-side CORBA-compliant interceptor intercepting:
   (1) messages generated by said first service when invoking said third service as a target of said first service; and
   (2) messages generated by said third service when responding to said invocation messages generated by said first service;
   said third client-side CORBA-compliant interceptor intercepting:
   (1) messages generated by said fourth service when invoking said first service as a target of said fourth service;
   (2) messages generated by said fourth service when invoking said second service as a target of said fourth service;
   (3) messages generated by said first service when responding to said invocation messages generated by said fourth service; and
   (4) messages generated by said second service when responding to said invocation messages generated by said fourth service;
   said third target-side CORBA-compliant interceptor intercepting:
   (1) messages generated by said first service when invoking said fourth service as a target of said first service;
   (2) messages generated by said fourth service when responding to said invocation messages generated by said first service;
   (3) messages generated by said second service when invoking said fourth service as a target of said second service; and
   (4) messages generated by said fourth service when responding to said invocation messages generated by said second service;
   each one of said second and third client-side CORBA-compliant interceptors and said second and third target-side CORBA-compliant interceptors selecting, from each said invocation and response message intercepted thereby, information useful in determining a cause of a failed usage of said third and fourth services, writing said selected information from each said intercepted invocation and response message to said second data store residing in said third server and re-invoking each said invocation and response message intercepted thereby.

2. The computer network of claim 1, wherein:

said first server is an access server, said first service is an access service, said second server is a registry server, said second service is an AAR service, and said database is a registry database; and said first data store residing in said registry server maintaining data derived from each message generated in connection with the invocation of:
  (1) said access service as said a target of said AAR service;
  (2) said registry database as a target of said AAR service;
  (3) said AAR service as a target of said access service.

3. The computer network of claim 1, wherein:

said first server is an access server, said first service is an access service, said second server is a first registry server, said second service is a first AAR service, said third server is a second registry server, said third service is a second AAR service, said fourth service is a SM service and said database is a registry database; and said first data store residing in said first registry server maintaining data derived from each message generated in connection with the invocation of:
  (1) said access service as a target of said first AAR service;
  (2) said registry database as a target of said first AAR service;
  (3) said SM service as a target of said first AAR service; and
  (4) said first AAR service as a target of said access service;

said second data store residing in said second registry server maintaining data derived from each message generated in connection with the invocation of:
  (1) said access service as a target of said second AAR service;
  (2) said registry database as a target of said second AAR service;
  (3) said SM service as a target of said second AAR service;
  (4) said second AAR service as a target of said access service;
  (5) said access service as a target of said SM service; and
  (6) said SM service as a target of said access service.

4. The computer network of claim 3, wherein said information selected from each intercepted exchange between:
  (1) said AAR services of said first registry server and said registry database;
  (2) said AAR services of said first registry server and said access server;
  (3) said AAR services of said first registry server and said SM service of said second registry server;
  (4) said AAR services of said second registry server and said registry database;
  (5) said AAR services of said second registry server and said access server; and
  (6) said AAR services of said second registry server and said SM service of said second registry server;

identifies:
  (1) a user for which said AAR service is being utilized;
  (2) a destination of said intercepted exchange;
  (3) the time of interception; and
  (4) whether said intercepted exchange had been successfully routed between an originating device and the destination.

5. The computer network of claim 4, further comprising:

a web server having a runtime service residing therein, said web server coupled to the second registry server through said second ORB;

said third target-side CORBA-compliant interceptor further intercepting messages generated by said runtime service when invoking said SM service of said registry server.

6. A computer-implemented method for troubleshooting a multi-tiered secured computer network having a first plurality of web servers, each having a runtime service residing therein, and a second plurality of access servers, each having an access service residing therein, in a first, extranet, tier and a third plurality of registry servers and a registry database in a second, intranet, tier, a first one of said third plurality of registry servers having an SM service, an AAR service and a data store residing therein and remaining ones of said third plurality of registry servers each having an AAR service and a data store residing therein, comprising:

use of at least one CORBA-compliant interceptor for the following intercepting actions:

intercepting all exchanges between said registry database and each said AAR service of said third plurality of registry servers;

for each intercepted exchange between said registry database and each said AAR service of said third plurality of registry servers, recording selected data regarding said exchange in said data store of a registry server in which said AAR service involved in said exchange resides;

intercepting all exchanges between each said AAR service of said third plurality of registry servers and each said access service of said second plurality of access servers;

for each intercepted exchange between each said AAR service of said third plurality of registry servers and each said access service of said second plurality of access servers, recording selected data regarding said exchange in said data store of said registry server in which said AAR service involved in said exchange resides;

intercepting all exchanges between said SM service of a first registry server and each said AAR service of said third plurality of registry servers;

for each intercepted exchange between said SM service of said first registry server and each said AAR service of said third plurality of registry servers, recording selected data regarding said exchange in said data store of said first registry server;

intercepting all exchanges between said SM service of said first registry server and each said runtime service of said first plurality of web servers;

for each intercepted exchange between said SM service of said first registry server and each said runtime service of said first plurality of web servers, recording selected data regarding said exchange in said data store of said first registry server;

reviewing said selected data recorded at one or more of said third plurality of registry servers to obtain useful information regarding a failure of said computer network; and troubleshooting said failure of said computer network using said useful information obtained during said reviewing.

7. The method of claim 6, wherein recording, for each intercepted exchange between said registry database and each said AAR service of said third plurality of registry servers and between each said AAR service of said third plurality of registry servers and said second plurality of access servers, selected data regarding each said exchange in said data store of said registry server in which said AAR service involved in said exchange resides further comprises recording the identity of the user requesting authentication/authorization, the destination of said exchange, the time of interception of said exchange and whether said exchange was successfully routed.

8. The method of claim 7, wherein recording, for each said intercepted exchange between said SM service of said first registry server and each said AAR service of said third plurality of registry servers and between said SM service of said first registry server and each said logtime service of said first plurality web servers, selected data regarding said exchange in said data store of said first registry server further comprises recording the identity of the user engaged in a session to which said exchange relates, the destination of said exchange, the time of interception of said exchange and whether said exchange was successfully routed.

* * * * *